(12) United States Patent
Danieau et al.

(10) Patent No.: US 12,142,013 B2
(45) Date of Patent: Nov. 12, 2024

(54) HAPTIC ATLAS CODING AND DECODING FORMAT

(71) Applicant: InterDigital CE Patent Holdings, Paris (FR)

(72) Inventors: Fabien Danieau, Rennes (FR); Julien Fleureau, Rennes (FR); Gaetan Moisson-Franckhauser, Andouillé-Neuville (FR); Philippe Guillotel, Vern sur Seiche (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 169 days.

(21) Appl. No.: 17/765,224

(22) PCT Filed: Sep. 28, 2020

(86) PCT No.: PCT/EP2020/077100
§ 371 (c)(1),
(2) Date: Mar. 30, 2022

(87) PCT Pub. No.: WO2021/063886
PCT Pub. Date: Apr. 8, 2021

(65) Prior Publication Data
US 2022/0343546 A1 Oct. 27, 2022

(30) Foreign Application Priority Data
Oct. 1, 2019 (EP) .................................. 19306251

(51) Int. Cl.
*H04N 7/12* (2006.01)
*G06T 9/00* (2006.01)
(Continued)

(52) U.S. Cl.
CPC ................. *G06T 9/00* (2013.01); *G08B 6/00* (2013.01); *H04N 19/20* (2014.11); *H04N 19/70* (2014.11)

(58) Field of Classification Search
CPC . G06T 9/00; G08B 6/00; H04N 19/20; H04N 19/70; H04N 19/597; H04N 19/25
See application file for complete search history.

(56) References Cited

U.S. PATENT DOCUMENTS 10,359,855 B1 * 7/2019 Vonikakis ............. B60W 50/16
10,521,881 B1 * 12/2019 Eble ....................... G06T 3/0093
(Continued)

FOREIGN PATENT DOCUMENTS

EP 3495922 A1 6/2019

OTHER PUBLICATIONS

Cha et al., "A Framework for Haptic Broadcasting", Institute for Electronics and Electrical Engineers (IEEE), IEEE Multimedia, vol. 16, Issue No. 3, Sep. 1, 2009, 12 pages.
(Continued)

*Primary Examiner* — Gims S Philippe
(74) *Attorney, Agent, or Firm* — Volpe Koenig

(57) ABSTRACT

Methods and devices for encoding and decoding a data stream representative of a 3D volumetric scene comprising haptic features associated with objects of the 3D scene are disclosed. At the encoding, haptic features are associated with objects of the scene, for instance as haptic maps. Haptic components are stored in points of the 3D scene as color may be. These components are projected onto patch pictures which are packed in atlas images. At the decoding, haptic components are un-projected onto reconstructed points as color may be according to the depth component of pixels of the decoded atlases.

15 Claims, 5 Drawing Sheets

(51) Int. Cl.
    *G08B 6/00*    (2006.01)
    *H04N 19/20*   (2014.01)
    *H04N 19/70*   (2014.01)

(56) References Cited

U.S. PATENT DOCUMENTS

2014/0071117 A1* 3/2014 Schuckle .............. G06F 3/0416
                                                        345/419
2019/0227633 A1* 7/2019 Vezzoli ................. G06F 3/011
2021/0173485 A1* 6/2021 Ryu ...................... G06F 3/011

OTHER PUBLICATIONS

Vadakital et al., "Carriage of Metadata for Immersive Media (video) in ISOBMFF", International Organization for Standardization, ISO/IEC JTC1/SC29/WG11, Document: MPEG2019/M49229, Gothenburg, Sweden, Jul. 2019, 4 pages.

Anonymous, "Information Technology—Media Context and Control—Part 1: Architecture", International Organization for Standardization (ISO) and International Electrotechnical Commission (IEC), ISO/IEC JTC 1/SC 29 N, Document: ISO/IEC CD 23005-1, Jan. 7, 2014, 63 pages.

Boyce et al., "Working Draft 1 of Metadata for Immersive Media (Video)", International Organization for Standardization, ISO/IEC JTC1/SC29/WG11, Document: MPEG2018/M18464, Geneva, Switzerland, Mar. 2019, 33 pages.

Danieau et al., "HFX Studio: Haptic Editor for Full-Body Immersive Experiences", Association for Computing Machinery (ACM), VRST '18: Proceedings of the 24th ACM Symposium on Virtual Reality Software and Technology, Article No. 37, Nov. 28, 2018, 9 pages.

Costes et al., "Haptic Material: A Holistic Approach for Haptic Texture Mapping", International Conference on Human Haptic Sensing and Touch Enable Computer Applications, EuroHaptics 2018: Haptics: Science, Technology, and Applications, LNISA, vol. 10894, 12 pages.

Higashi et al., "Hardness Perception by Tapping: Effect of Dynamic Stiffness of Objects", Institute of Electronics and Electrical Engineers (IEEE), IEEE World Haptics Conference (WHO), Munich, Germany, Jun. 6, 2017, 5 pages.

Cha et al., "An Authoring/Editing Framework for Haptic Broadcasting: Passive HapticBIFS", Second Joint EuroHaptics Conference and Symposium on Haptic Interfaces for VirtualTeleoperator Systems (WHC'07), Tsukuba, Japan, Mar. 22, 2007, 6 pages.

* cited by examiner

HAPTIC ATLAS CODING AND DECODING FORMAT

CROSS REFERENCE TO RELATED APPLICATIONS

This application is a U.S. National Stage Application under 35 U.S.C. 371 of International Patent Application No. PCT/EP2020/077100, filed Sep. 28, 2020, which is incorporated herein by reference in its entirety.

This application claims the benefit of European Patent Application No. 19306251.0, filed Oct. 1, 2019, which is incorporated herein by reference in its entirety.

1. TECHNICAL FIELD

The present principles generally relate to the domain of three-dimensional (3D) scene and volumetric video content. The present document is also understood in the context of the encoding, the formatting and the decoding of enriched video format for a rendering of volumetric content in correlation with haptic effect on end-user devices such as mobile devices or Head-Mounted Displays (HMD).

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Research results in virtual reality (VR) have shown that stimulating more senses than sight and hearing increases the feeling of immersion. Today's HMDs are shipped with hand controllers allowing the user to control an avatar within the virtual world, and therefore to "touch" virtual objects. Haptic feedback is provided thanks to vibrators embedded into the controllers.

As of today, VR content can be distributed with various formats, considering a 2D or 3D 360° video representation. Among those formats, MPEG is currently specifying formats for 360° volumetric video data (referenced by MPEG-I), one considering point clouds (PCC, MPEG-I part 5) and the other one considering video+depth (3DoF+, MPEG-I part 12). However, those formats are limited to audiovisual content.

It would be valuable to add data describing haptic, gustatory or olfactory content. The MPEG-V [MPEG-V] architecture is one formalization of the distribution of audiovisual content augmented with "sensory effects". The MPEG-V standard describes these sensory effects which includes haptic effects but also gustatory and olfactory effects. MPEG-V supports several haptic effects such as vibrations, rigid body motion or force-feedback. Besides the effects can stimulate the entire user's body or target a specific point in a space shared by the user.

Although this format is generic enough to describe many effects, associating precise spatial haptic properties to visual objects is not possible (i.e. defining the texture of an object, its local stiffness and thermal properties). In addition, one would like to re-use the MPEG-I video container and add this haptic information.

3. SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate a method comprising:
  obtaining a 3D scene, at least one point of said 3D scene comprising at least one component relative to a haptic feature;
  projecting depth component and said at least one component relative to a haptic feature said 3D scene onto patch pictures; and
  packing said patch pictures in an atlas image;

In a particular embodiment, depth component and said component relative to a haptic feature are projected on different patch pictures, said different patch pictures being packed in different atlases. In another embodiment, the haptic feature is encoded as a color value. In some embodiments, the haptic feature belongs to a set of haptic features comprising rate-hardness, contact area spread rate, dynamic stiffness, local surface orientation, local indentation, stroke spectral response, kinetic friction, static friction, stick-slip and thermal profile.

The present principles also relate to a device comprising a processor configured to perform the method above.

The present principles also relate to a method comprising:
  obtaining a data stream comprising an atlas image packing patch pictures, said patch pictures being projections of points of a 3D scene and comprising a depth component and at least one component relative to a haptic feature;
  un-projecting components of pixels of said atlas by associating said at least one component relative to a haptic feature to points un-projected relatively to said depth component of said pixels.

In an embodiment, the method further comprises rendering haptic effects according to said at least one component relative to a haptic feature associated with points of the un-projected 3D scene and to a distance of a virtual camera used to render said 3D scene to said points.

In some embodiments, said haptic feature is encoded as a color value and/or depth component and said component relative to a haptic feature are projected on different patch pictures, said different patch pictures being packed in different atlases.

The present principles also relate to a device comprising a processor configured to perform the method above. The present principles also relate to a non-transitory medium storing data comprising an atlas image packing patch pictures, said patch pictures being projections of points of a 3D scene and comprising a depth component and at least one component relative to a haptic feature.

4. BRIEF DESCRIPTION OF DRAWINGS

The present disclosure will be better understood, and other specific features and advantages will emerge upon reading the following description, the description making reference to the annexed drawings wherein.

5. DETAILED DESCRIPTION OF EMBODIMENTS

Figure 1:
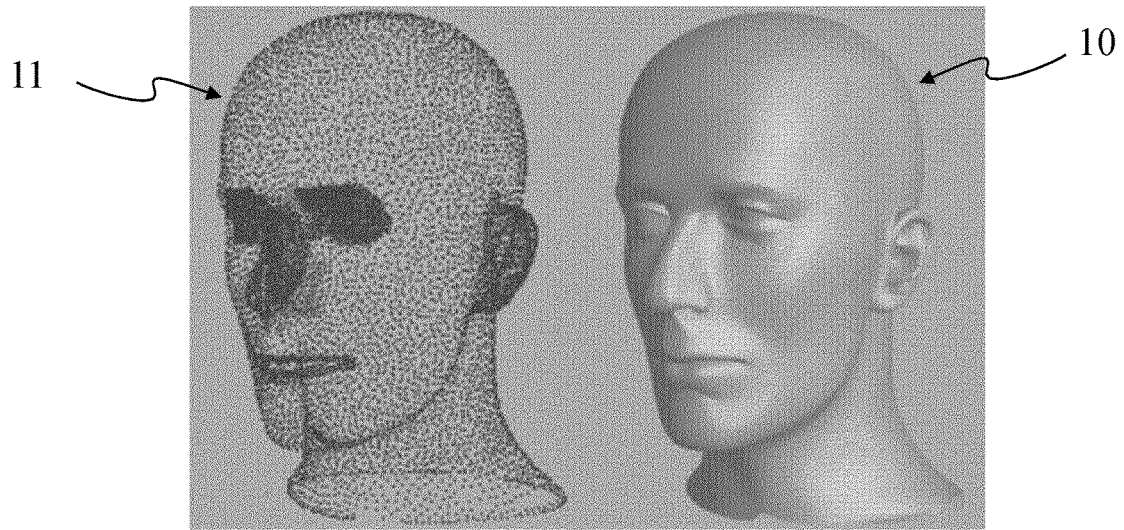
FIG. 1 shows a three-dimension (3D) model of an object and points of a point cloud corresponding to the 3D model, according to a non-limiting embodiment of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

FIG. 1 shows a three-dimension (3D) model 10 of an object and points of a point cloud 11 corresponding to 3D model 10. 3D model 10 and the point cloud 11 may for example correspond to a possible 3D representation of an object of the 3D scene comprising other objects. Model 10 may be a 3D mesh representation and points of point cloud 11 may be the vertices of the mesh. Points of point cloud 11 may also be points spread on the surface of faces of the mesh. Model 10 may also be represented as a splatted version of point cloud 11, the surface of model 10 being created by splatting the points of the point cloud 11. Model 10 may be represented by a lot of different representations such as voxels or splines. FIG. 1 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any representation of this 3D object, for example a point cloud, a mesh, a spline model or a voxel model.

A point cloud may be represented in memory, for instance, as a vector-based structure, wherein each point has its own coordinates in the frame of reference of a viewpoint (e.g. three-dimensional coordinates XYZ, or a solid angle and a distance (also called depth) from/to the viewpoint) and one or more attributes, also called component. An example of component is the color component that may be expressed in various color spaces, for example RGB (Red, Green and Blue) or YUV (Y being the luma component and UV two chrominance components). The point cloud is a representation of a 3D scene comprising objects. The 3D scene may be seen from a given viewpoint or a range of viewpoints. The point cloud may be obtained by many ways, e.g.:

from a capture of a real object shot by a rig of cameras, optionally complemented by depth active sensing device;

from a capture of a virtual/synthetic object shot by a rig of virtual cameras in a modelling tool;

from a mix of both real and virtual objects.

A 3D scene, in particular when prepared for a 3DoF+ rendering may be represented by a Multi-View+Depth (MVD) frame. A volumetric video is then a sequence of MVD frames. In this approach, the volumetric information is conveyed as a combination of color and depth patches stored in corresponding color and depth atlases which are then video encoded making use of regular codecs (typically HEVC). Each combination of color and depth patches typically represents a subpart of the MVD input views and the set of all patches is designed at the encoding stage to cover the entire scene while being as less redundant as possible. At the decoding stage, the atlases are first video decoded and the patches are rendered in a view synthesis process to recover the viewport associated to a desired viewing position.

Figure 2:
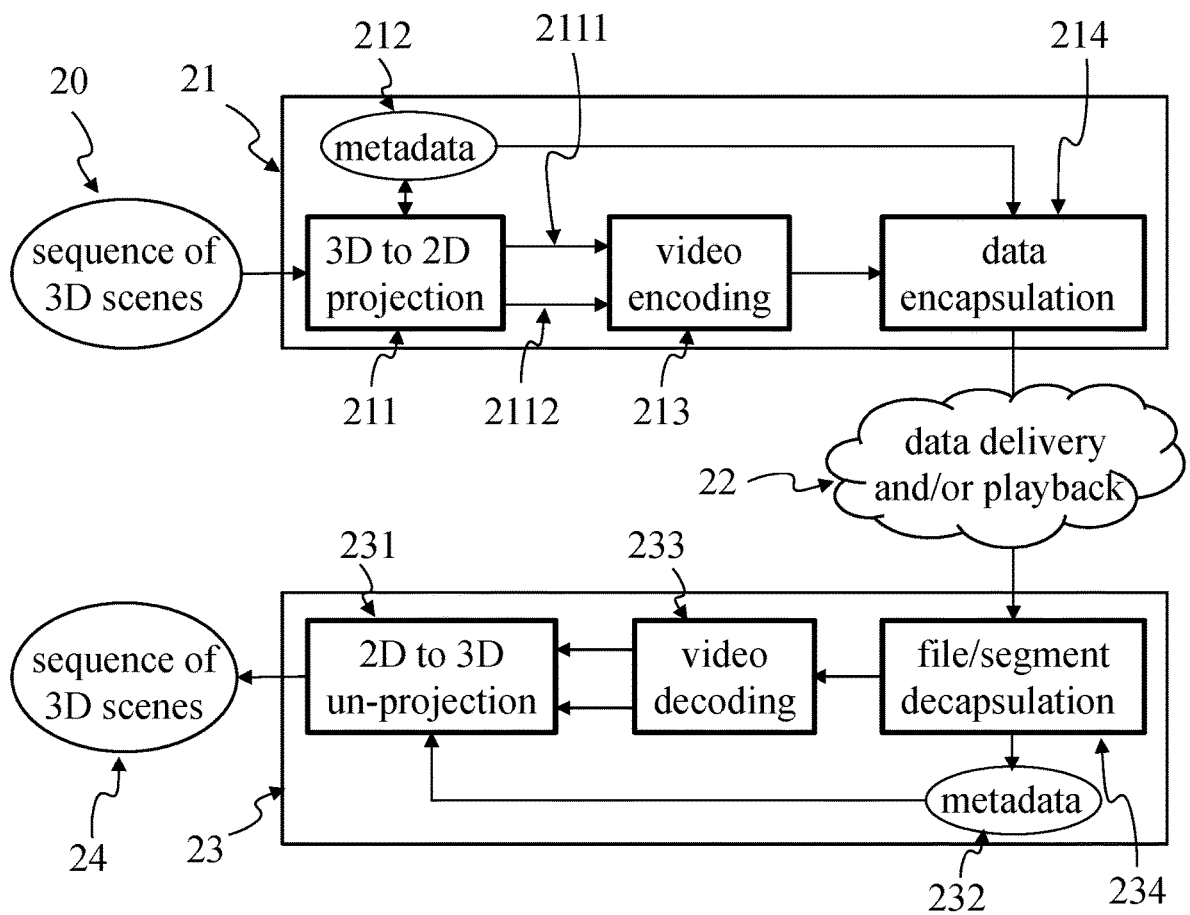
FIG. 2 shows a non-limitative example of the encoding, transmission and decoding of data representative of a sequence of 3D scenes, according to a non-limiting embodiment of the present principles.

FIG. 2 shows a non-limitative example of the encoding, transmission and decoding of data representative of a sequence of 3D scenes. The encoding format that may be, for example and at the same time, compatible for 3DoF, 3DoF+ and 6DoF decoding.

A sequence of 3D scenes 20 is obtained. As a sequence of pictures is a 2D video, a sequence of 3D scenes is a 3D (also called volumetric) video. A sequence of 3D scenes may be provided to a volumetric video rendering device for a 3DoF, 3Dof+ or 6DoF rendering and displaying.

Sequence of 3D scenes 20 is provided to an encoder 21. The encoder 21 takes one 3D scenes or a sequence of 3D scenes as input and provides a bit stream representative of the input. The bit stream may be stored in a memory 22 and/or on an electronic data medium and may be transmitted over a network 22. The bit stream representative of a sequence of 3D scenes may be read from a memory 22 and/or received from a network 22 by a decoder 23. Decoder 23 is inputted by said bit stream and provides a sequence of 3D scenes, for instance in a point cloud format.

Encoder 21 may comprise several circuits implementing several steps. In a first step, encoder 21 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. Projection circuit 211 provides at least one two-dimensional frame 2111 for a 3D scene of sequence 20. Frame 2111 comprises color information and depth information representative of the 3D scene projected onto frame 2111. In a variant, color information and depth information are encoded in two separate frames 2111 and 2112.

Metadata 212 are used and updated by projection circuit 211. Metadata 212 comprise information about the projection operation (e.g. projection parameters) and about the way color and depth information is organized within frames 2111 and 2112 as described in relation to FIGS. 5 to 7.

A video encoding circuit 213 encodes sequence of frames 2111 and 2112 as a video. Pictures of a 3D scene 2111 and 2112 (or a sequence of pictures of the 3D scene) is encoded in a stream by video encoder 213. Then video data and metadata 212 are encapsulated in a data stream by a data encapsulation circuit 214.

Encoder 213 is for example compliant with an encoder such as:

JPEG, specification ISO/CEI 10918-1 UIT-T Recommendation T.81, https://www.itu.int/rec/T-REC-T.81/en;

AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en, HEVC (its specification is found at the ITU website, T recommendation, H series, h265, http://www.itu.int/rec/T-REC-H.265-201612-I/en);

3D-HEVC (an extension of HEVC whose specification is found at the ITU website, T recommendation, H series, h265, http://www.itu.int/rec/T-REC-H.265-201612-I/en annex G and I);

VP9 developed by Google;

AV1 (AOMedia Video 1) developed by Alliance for Open Media; or

Future standards like Versatile Video Coder or MPEG-I or MPEG-V future versions.

The data stream is stored in a memory that is accessible, for example through a network 22, by a decoder 23. Decoder 23 comprises different circuits implementing different steps of the decoding. Decoder 23 takes a data stream generated by an encoder 21 as an input and provides a sequence of 3D scenes 24 to be rendered and displayed by a volumetric video display device, like a Head-Mounted Device (HMD). Decoder 23 obtains the stream from a source 22. For example, source 22 belongs to a set comprising:

a local memory, e.g. a video memory or a RAM (or Random-Access Memory), a flash memory, a ROM (or Read Only Memory), a hard disk;

a storage interface, e.g. an interface with a mass storage, a RAM, a flash memory, a ROM, an optical disc or a magnetic support;

a communication interface, e.g. a wireline interface (for example a bus interface, a wide area network interface, a local area network interface) or a wireless interface (such as a IEEE 802.11 interface or a Bluetooth® interface); and a user interface such as a Graphical User Interface enabling a user to input data.

Decoder 23 comprises a circuit 234 for extract data encoded in the data stream. Circuit 234 takes a data stream as input and provides metadata 232 corresponding to metadata 212 encoded in the stream and a two-dimensional video. The video is decoded by a video decoder 233 which provides a sequence of frames. Decoded frames comprise color and depth information. In a variant, video decoder 233 provides two sequences of frames, one comprising color information, the other comprising depth information. A circuit 231 uses metadata 232 to un-project color and depth information from decoded frames to provide a sequence of 3D scenes 24. Sequence of 3D scenes 24 corresponds to sequence of 3D scenes 20, with a possible loss of precision related to the encoding as a 2D video and to the video compression.

Figure 3:
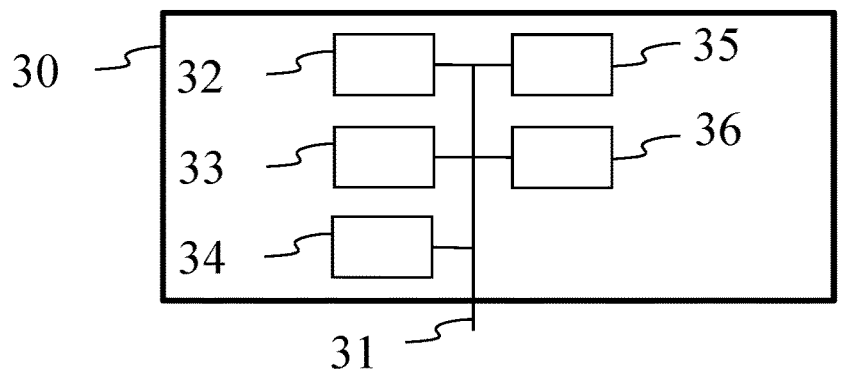
FIG. 3 shows an example architecture of a device which may be configured to implement a method described in relation with FIGS. 11 and 12, according to a non-limiting embodiment of the present principles.
Figure 11:
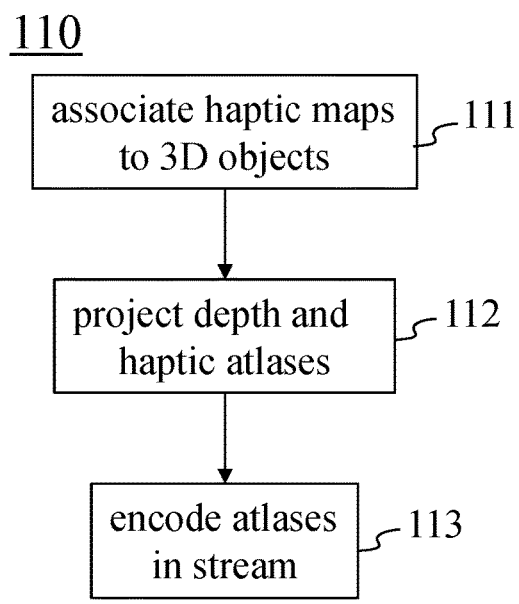
FIG. 11 illustrates a method for encoding haptic features associated with material of 3D objects of a 3D scene for a volumetric rendering, according to a non-limiting embodiment of the present principles.
Figure 12:
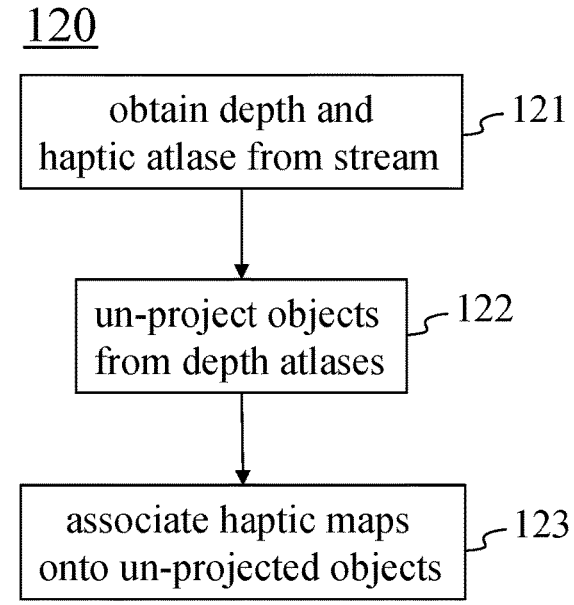
FIG. 12 illustrates a method for decoding haptic features associated with material of 3D objects of a 3D scene for a volumetric rendering, according to a non-limiting embodiment of the present principles.

FIG. 3 shows an example architecture of a device 30 which may be configured to implement a method described in relation with FIGS. 11 and 12. Encoder 21 and/or decoder 23 of FIG. 2 may implement this architecture. Alternatively, each circuit of encoder 21 and/or decoder 23 may be a device according to the architecture of FIG. 3, linked together, for instance, via their bus 31 and/or via I/O interface 36.

Device 30 comprises following elements that are linked together by a data and address bus 31:
- a microprocessor 32 (or CPU), which is, for example, a DSP (or Digital Signal Processor);
- a ROM (or Read Only Memory) 33;
- a RAM (or Random Access Memory) 34;
- a storage interface 35;
- an I/O interface 36 for reception of data to transmit, from an application; and
- a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with FIGS. 11 and 12, and belongs to a set comprising:
- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).

Figure 4:
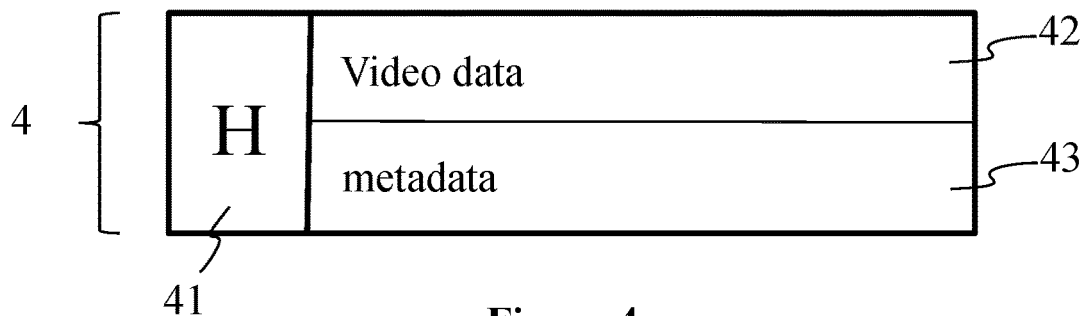
FIG. 4 shows an example of an embodiment of the syntax of a stream when the data are transmitted over a packet-based transmission protocol, according to a non-limiting embodiment of the present principles.

FIG. 4 shows an example of an embodiment of the syntax of a stream when the data are transmitted over a packet-based transmission protocol. FIG. 4 shows an example structure 4 of a volumetric video stream. The structure consists in a container which organizes the stream in independent elements of syntax. The structure may comprise a header part 41 which is a set of data common to every syntax elements of the stream. For example, the header part comprises some of metadata about syntax elements, describing the nature and the role of each of them. The header part may also comprise a part of metadata 212 of FIG. 2, for instance the coordinates of a central point of view used for projecting points of a 3D scene onto frames 2111 and 2112. The structure comprises a payload comprising an element of syntax 42 and at least one element of syntax 43. Syntax element 42 comprises data representative of the color and depth frames. Images may have been compressed according to a video compression method.

Element of syntax 43 is a part of the payload of the data stream and may comprise metadata about how frames of element of syntax 42 are encoded, for instance parameters used for projecting and packing points of a 3D scene onto frames. Such metadata may be associated with each frame of the video or to group of frames (also known as Group of Pictures (GoP) in video compression standards).

Figure 5:
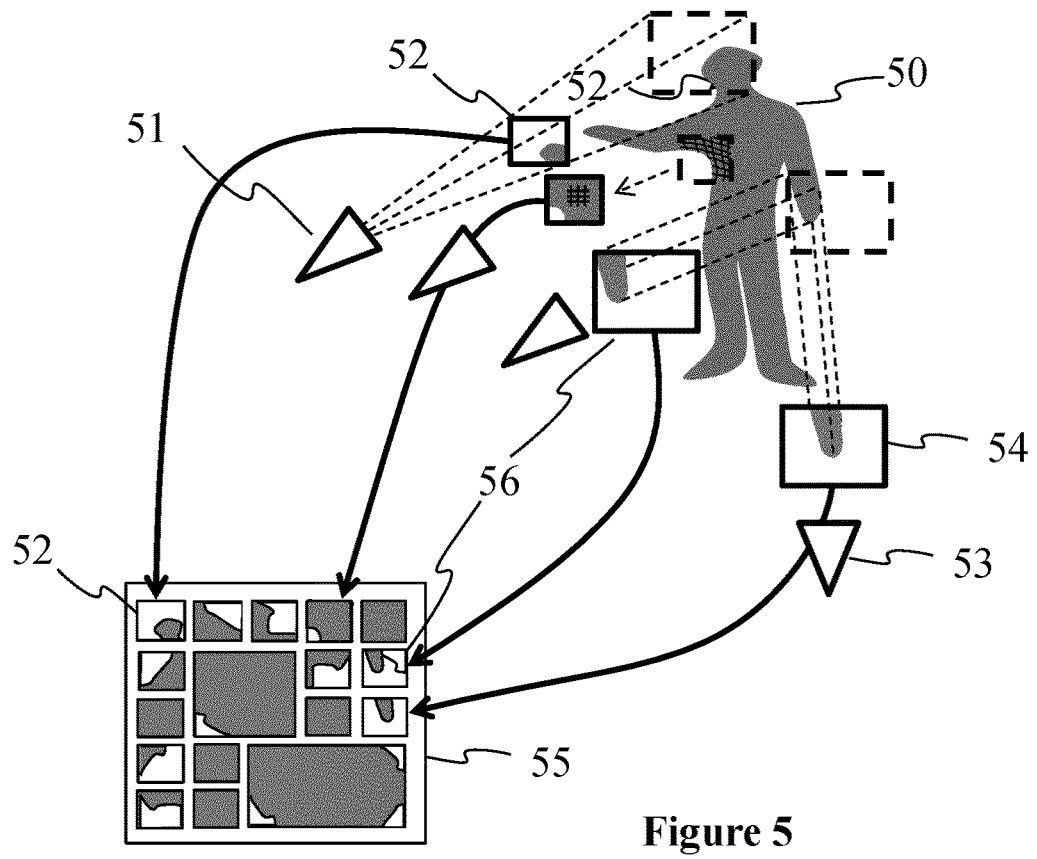
FIG. 5 illustrates the patch atlas approach with an example of 4 projection centers, according to a non-limiting embodiment of the present principles.

FIG. 5 illustrates the patch atlas approach with an example of 4 projection centers. 3D scene 50 comprises a character. For instance, center of projection 51 is a perspective camera and camera 53 is an orthographic camera. Cameras may also be omnidirectional cameras with, for instance a spherical mapping (e.g. Equi-Rectangular mapping) or a cube mapping. The 3D points of the 3D scene are projected onto the 2D planes associated with virtual cameras located at the projection centers, according to a projection operation described in projection data of metadata. In the example of FIG. 5, projection of the points captured by camera 51 is mapped onto patch 52 according to a perspective mapping and projection of the points captured by camera 53 is mapped onto patch 54 according to an orthographic mapping.

The clustering of the projected pixels yields a multiplicity of 2D patches, which are packed in a rectangular atlas 55. The organization of patches within the atlas defines the atlas layout. In an embodiment, two atlases with identical layout: one for texture (i.e. color) information and one for depth information. Two patches captured by a same camera or by two distinct cameras may comprise information representative of a same part of the 3D scene, like, for instance patches 54 and 56.

The packing operation produces a patch data for each generated patch. A patch data comprises a reference to a projection data (e.g. an index in a table of projection data or a pointer (i.e. address in memory or in a data stream) to a projection data) and information describing the location and the size of the patch within the atlas (e.g. top left corner coordinates, size and width in pixels). Patch data items are added to metadata to be encapsulated in the data stream in association with the compressed data of the one or two atlases.

Figure 6:
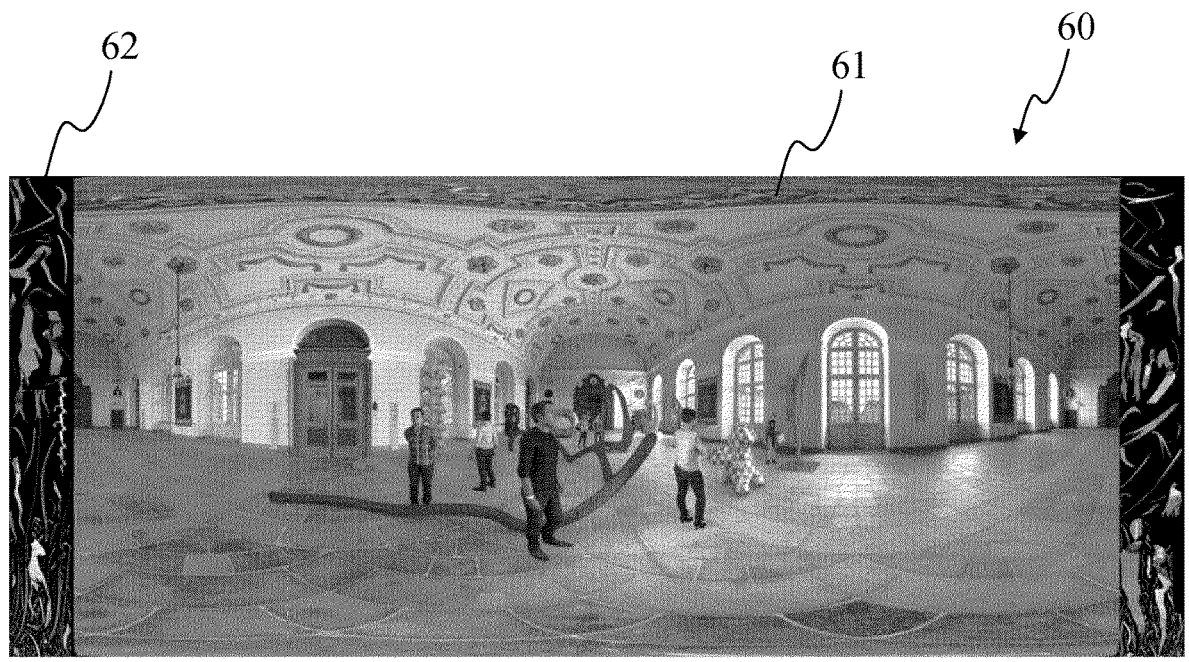
FIG. 6 shows an example of an atlas comprising the texture information of the points of a 3D scene, according to a non-limiting embodiment of the present principles.

FIG. 6 shows an example of an atlas 60 comprising the texture information (e.g. RGB data or YUV data) of the points of a 3D scene, according to a non-limiting embodiment of the present principles. As explained in relation to FIG. 5, an atlas is an image packing patches, a patch being a picture obtained by projecting a part of the points of the 3D scene.

In the example of FIG. 6, atlas 60 comprises a first part 61 comprising the texture information of the points of the 3D scene that are visible from a point of view and one or more second parts 62. The texture information of first part 61 may for example be obtained according to an equirectangular projection mapping, an equirectangular projection mapping being an example of spherical projection mapping. In the example of FIG. 6, the second parts 62 are arranged at the left and right borders of first part 61 but the second parts may be arranged differently. Second parts 62 comprise texture information of parts of the 3D scene that are complementary to the part visible from the point of view. The second parts may be obtained by removing from the 3D scene the points that are visible from the first viewpoint (the texture of which being stored in the first part) and by projecting the remaining points according to the same point of view. The latter process may be reiterated iteratively to obtain at each time the hidden parts of the 3D scene. According to a variant, the second parts may be obtained by removing from the 3D scene the points that are visible from the point of view, for example a central point of view, (the texture of which being stored in the first part) and by projecting the remaining points according to a point of view different from the first point of view, for example from one or more second point of view of a space of view centred onto the central point of view (e.g. the viewing space of a 3DoF rendering).

First part 61 may be seen as a first large texture patch (corresponding to a first part of the 3D scene) and the second parts 62 comprises smaller textures patches (corresponding to second parts of the 3D scene that are complementary to the first part). Such an atlas has the advantage to be compatible at the same time with 3DoF rendering (when rendering only first part 61) and with 3DoF+/6DoF rendering.

Figure 7:
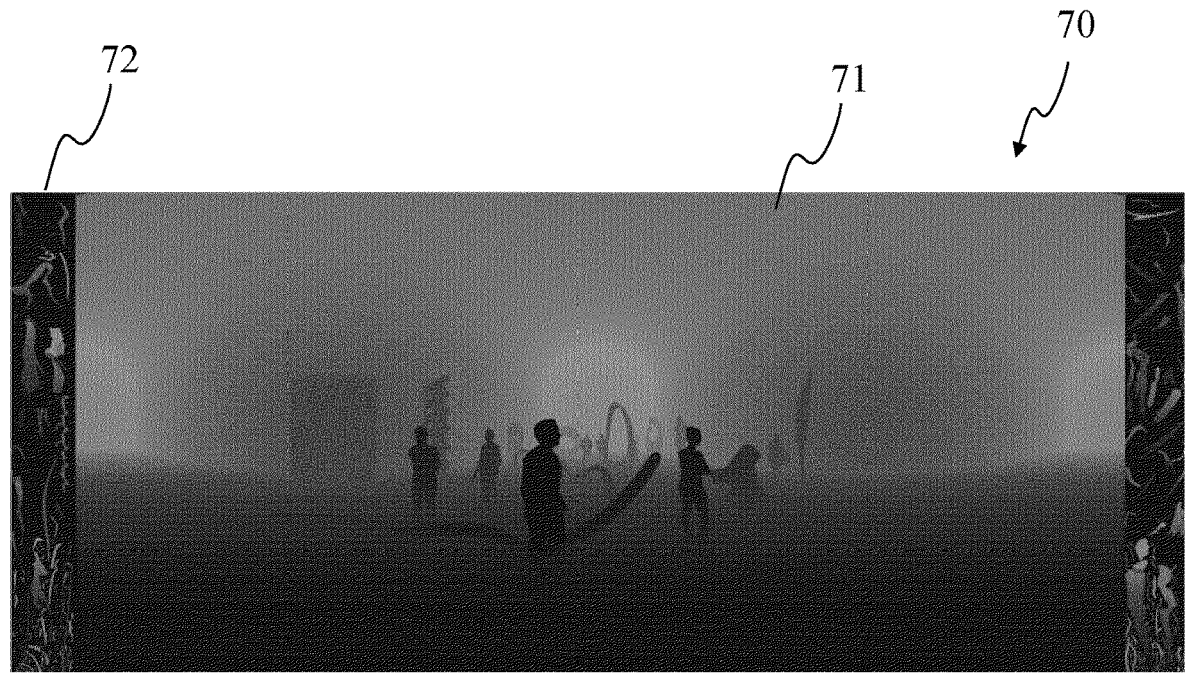
FIG. 7 shows an example of an atlas comprising the depth information of the points of the 3D scene of FIG. 6, according to a non-limiting embodiment of the present principles.

FIG. 7 shows an example of an atlas 70 comprising the depth information of the points of the 3D scene of FIG. 6, according to a non-limiting embodiment of the present principles. Atlas 70 may be seen as the depth image corresponding to texture image 60 of FIG. 6.

Atlas 70 comprises a first part 71 comprising the depth information of the points of the 3D scene that are visible from the central point of view and one or more second parts 72. Atlas 70 may be obtained in a same way as atlas 60 but contains the depth information associated with the points of the 3D scene instead of the texture information.

For 3DoF rendering of the 3D scene, only one point of view, typically the central point of view, is considered. The user may rotate his head in three degrees of freedom around the first point of view to watch various parts of the 3D scene, but the user cannot move this unique point of view. Points of the scene to be encoded are points which are visible from this unique point of view, and only the texture information is needed to be encoded/decoded for the 3DoF rendering. There is no need to encode points of the scene that are not visible from this unique point of view for a 3DoF rendering as the user cannot access to them.

With regard to 6DoF rendering, the user may move the viewpoint everywhere in the scene. In this case, it is required to encode every point (depth and texture) of the scene in the bitstream as every point is potentially accessible by a user who can move his/her point of view. At the encoding stage, there is no means to know, a priori, from which point of view the user will observe the 3D scene.

With regard to 3DoF+rendering, the user may move the point of view within a limited space around a central point of view. This enables to experience parallax. Data representative of the part of the scene visible from any point of the space of view is to be encoded into the stream, including the data representative of the 3D scene visible according to the central point of view (i.e. first parts 61 and 71). The size and shape of the space of view may for example be decided and determined at the encoding step and encoded in the bitstream. The decoder may obtain this information from the bitstream and the renderer limits the space of view to the space determined by the obtained information. According to another example, the renderer determines the space of view according to hardware constraints, for example in relation to capabilities of the sensor(s) that detects the movements of the user. In such a case, if, at the encoding phase, a point visible from a point within the space of view of the renderer has not been encoded in the bitstream, this point will not be rendered. According to a further example, data (e.g. texture and/or geometry) representative of every point of the 3D scene is encoded in the stream without considering the rendering space of view. To optimize the size of the stream, only a subset of the points of the scene may be encoded, for instance the subset of points that may be seen according to a rendering space of view.

The patches are created to be sufficiently non-redundant and complementary. A process to generate patches from Multi-view+Depth (MVD) representation of a 3D scene consists in "pruning" the input source views to remove any redundant information. To do so, each input view (color+ depth) are iteratively pruned one after the other. A set of unpruned views, called basic views, is first chosen among the source views and is fully transmitted. The set of remaining views, called additional views, is then iteratively processed to remove information (in terms of color and depth similarity) redundant with the basic views and with the already pruned additional view. Color or depth values of pruned pixels is replaced by a predetermined value, for example 0 or 255. For instance in FIGS. 6 and 7, central view 61+71 is a basic view. In other embodiments, an atlas may gather several basic views.

Figures 8, 9:
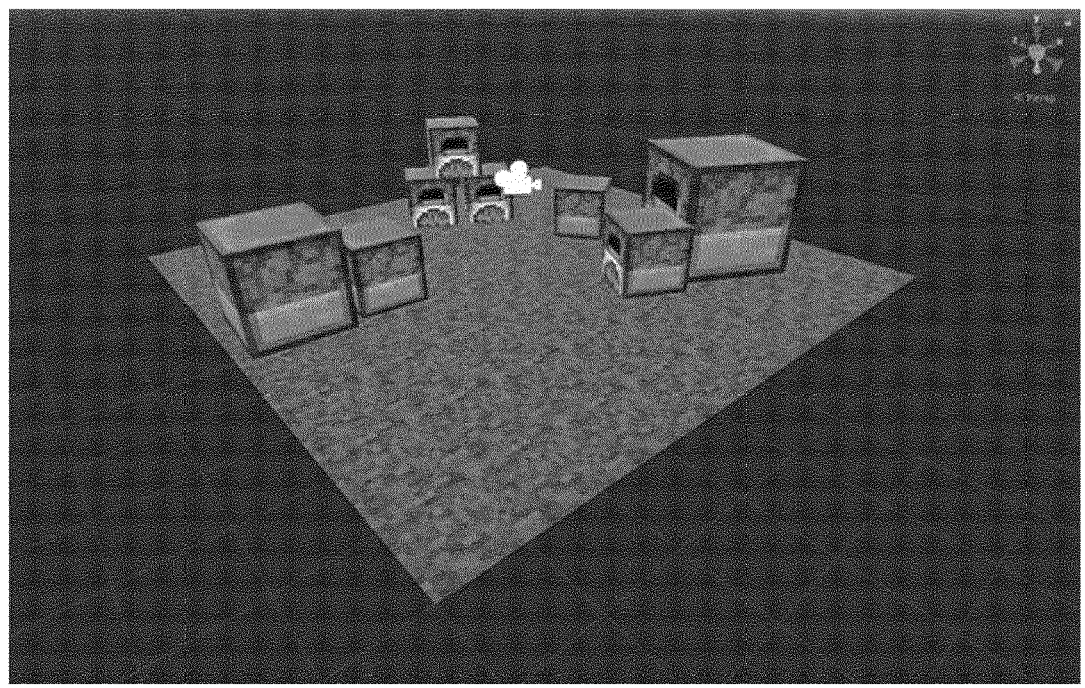
FIG. 8 illustrates the concept of haptic maps. These maps encode haptic information in a texture-like format, according to a non-limiting embodiment of the present principles.
FIG. 9 shows a computer graphics 3D scene comprising ovens, that are objects with haptic characteristics.

FIG. 8 illustrates the concept of "haptic maps". These maps encode haptic information in a texture-like format. Up to ten haptic features are described: compliance (rate-hardness, contact area spread rate, dynamic stiffness), surface geometry (local surface orientation, local indentation, stroke spectral response), friction (kinetic friction, static friction, stick-slip), and warmth (thermal profile).

The thermal map represents a hidden heat pipe system. Each pixel of these maps encodes the value for the corresponding haptic metric. It is then easy to describe precise spatial haptic information on any object surface.

Thanks to this image-based data format existing editing tools can easily be used (such as Maya, Unity or Unreal engines) to create this information. Similarly, to distribute it, existing video formats and containers can be extended to support this additional information. Haptic maps may be converted into atlases or into other point cloud representation formats with haptic data.

According to the present principles, haptic effects are added into volumetric video formats using video atlases to transmit color and depth data. These formats are extended by defining haptic atlases. Like a color atlas that comprises the color to be displayed, a haptic atlas comprises the haptic data to be rendered by a haptic device. For each type of haptic data (i.e. physical property) to be encoded a different atlas is created (for instance temperature, friction, etc.).

FIG. 9 shows a computer graphics 3D scene comprising ovens, that are objects with haptic characteristics. The 3D scene of FIG. 9 may be represented as a set of 2D patches packed in atlases as described in relation to FIGS. 5 to 7. Haptic data may be associated to the objects of this scene with an editing tool, either in the 3D original world or, equivalently, in the 2D reprojections. In the example of FIG. 9, the hardness of the oven as well as their temperatures are obtained.

In an embodiment, eleven haptic features are considered. The hardness is defined by the rate-hardness metric and the temperature by the temperature metric.

| ID | Haptic feature | Format | Range | Resolution |
|---|---|---|---|---|
| 0 | None | — | — | — |
| 1 | Rate-hardness | 8-bit | 0-10000 N.s−1/m.s−1 | 40 N.s−1/m.s−1 |
| 2 | Contact area spread rate | 8-bit | 0-25.6 N/cm 2 | 0.1 N/cm 2 |
| 3 | Local surface orientation | 24-bit (3x8-bit) | 2 × 0-180° | 0.002° |
| 4 | Local indentation | 8-bit | ±5 mm | 0.04 mm |
| 5 | Kinetic friction | 8-bit | ±5 | 0.04 |
| 6 | Static friction | 8-bit | ±5 | 0.04 |
| 7 | Relative temperature | 8-bit | ±25.4° | 0.2° |
| 8 | Temperature | 8-bit | [−50:+75]° C. | 0.5° C. |
| 9 | dynamic stiffness | 8-bit | 0-255 | 1-Index in table |
| 10 | stroke spectral response | 8-bit | 0-255 | 1-Index in table |
| 11 | stick-slip | 8-bit | 0-255 | 1-Index in table |

Dynamic stiffness, stroke spectral response and stick-slip do not encode directly a haptic value as an index of a table. The IDs correspond to a file in which coefficient of auto-regressive filters are stored. They model the vibration measured with materials during a brief contact (dynamic stiffness) or a stroke (stroke spectral response or stick-slip transient).

| Dynamic Stiffness | |
|---|---|
| Material | ID |
| Stainless | 0 |
| Aluminum | 1 |
| Polycarbonate | 2 |
| Acryl | 3 |
| Wax | 4 |
| Etc. | . . . 255 |

Figure 10:
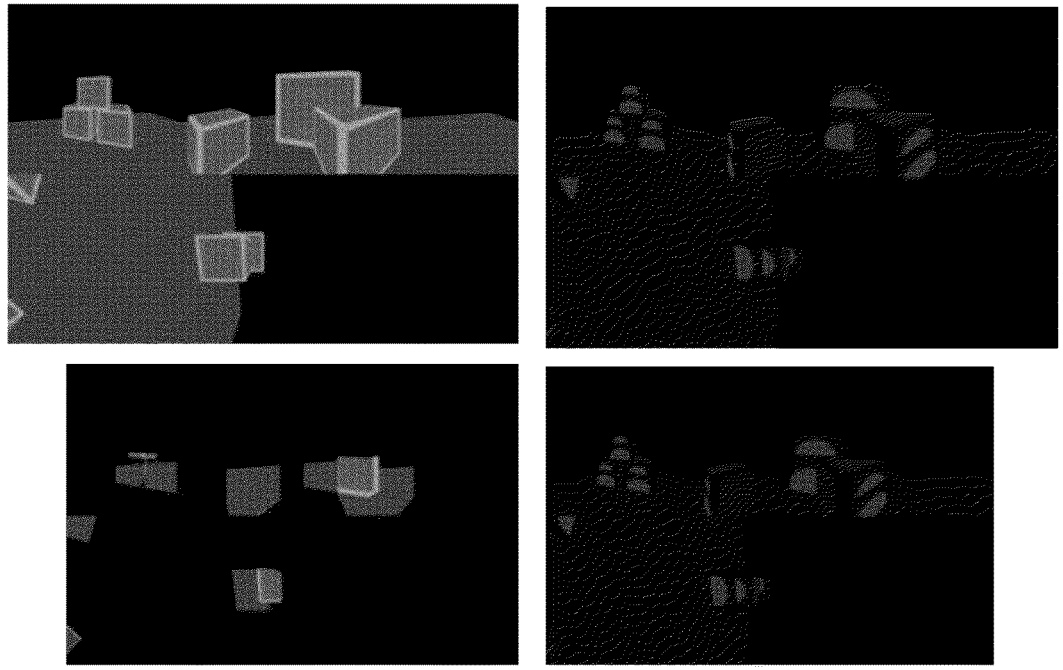
FIG. 10 shows atlases representative of haptic property maps obtained with a process used for generating color and/or depth atlases, according to a non-limiting embodiment of the present principles.

FIG. 10 shows atlases representative of haptic property maps obtained with a process used for generating color and/or depth atlases. In haptic atlases, a «value»/«intensity» of any haptic effect is associated to each pixel of the 2D reprojection view of FIG. 6 or 7.

The haptic atlases are created in a way similar to a color/depth atlas but instead of color/depth information, haptic information is stored. The number of haptic atlases created depends on the number of haptic features to be stored. In the example of FIGS. 9 and 10, two types of maps are created: one for the temperature (at the right in FIG. 10) and one for the hardness-rate (at the left in FIG. 10). As depicted, this approach allows to precisely define haptic zones in the scene. Temperature is the highest near the fire, hardness is highest at the edges of the ovens.

Haptic patches and color/depth patches of haptic and color/depth atlases may or may not be perfectly aligned: if only few objects have haptic properties then the number of patches contained in the haptic atlases may be very lower than the one of color/depth atlases.

To encode the types of haptic maps, the following syntax format is proposed:

| | Descriptor |
|---|---|
| atlas_params( a ) { | |
|   type[ a ] | u(8) |
|   num_patches_minus1[ a ] | u(16) |
|   for ( i = 0; i <= num_patches_minus1; i++ ) { | |
|     view_id[ a ][ i ] | u(8) |
|     patch_width_in_view[ a ][ i ] | u(16) |
|     patch_height_in_view[ a ][ i ] | u(16) |
|     patch_pos_in_atlas_x[ a ][ i ] | u(16) |
|     patch_pos_in_atlas_y[ a ][ i ] | u(16) |
|     patch_pos_in_view_x[ a ][ i ] | u(16) |
|     patch_pos_in_view_y[ a ][ i ] | u(16) |
|     patch_rotation[ a ][ i ] | u(8) |
|   } | |
| } | |

With a being the atlas ID and type defined as:

| type | data |
|---|---|
| 0 | Texture |
| 1 | Depth |
| 2 | Rate-hardness |
| 3 | Contact area spread rate |
| 4 | Local surface orientation |
| 5 | Local indentation |
| 6 | Kinetic friction |
| 7 | Static friction |
| 8 | Relative temperature |
| 9 | Temperature |

Each patch being encoded according to its type:

| type | Format |
|---|---|
| 0 | YUV420P10LE |
| 1 | YUV420P10LE |
| 2 | YUV400P |
| 3 | YUV400P |
| 4 | YUV444P |
| 5 | YUV400P |
| 6 | YUV400P |
| 7 | YUV400P |
| 8 | YUV400P |
| 9 | YUV400P |
| 10 | YUV400P |
| 11 | YUV400P |
| 12 | YUV400P |

In another embodiment, the Atlas params may be kept as defined in MPEG-I, but the Atlas parameters list may be changed:

| atlas_params_list( ) { | |
|---|---|
|   num_atlases_minus1 | u(8) |
|   for ( i = 0; i <= num_atlases_minus1; i++ ) { | |
|     atlas_id[ i ]; | u(8) |
|     atlas_type[ i ] | u(8) |
|     atlas_params( atlas_id[ i ] ) | |
|   } | |
| } | |

In another embodiment (which does not require to modify the current syntax), haptic atlases are defined separately in a dedicated additional/complementary structure,

```
haptic_atlas_params_list( ) {
    num_haptic_atlases_minus1                              u(8)
    for ( i = 0; i <= num_haptic_atlases_minus1; i++ ) {
        haptic_atlas_id[ i ];                              u(8)
        haptic_atlas_type[ i ]                             u(8)
        haptic_params( atlas_id[ i ] )
    }
}
```

With haptic atlas type defined as:

| haptic_atlas_type | data |
|---|---|
| 0 | Rate-hardness |
| 1 | Contact area spread rate |
| 2 | Local surface orientation |
| 3 | Local indentation |
| 4 | Kinetic friction |
| 5 | Static friction |
| 6 | Relative temperature |
| 7 | Temperature |
| 8 | dynamic stiffness |
| 9 | stroke spectral response |
| 10 | stick-slip |

FIG. 11 illustrates a method 110 for encoding haptic features associated with material of 3D objects of a 3D scene for a volumetric rendering. At a step 111, haptic maps are associated to objects of a 3D scene to be encoded for a volumetric rendering. A haptic map is generated and associated to an object for each haptic feature type this object embodies. In the present application, up to eleven features are proposed. At a step 112, a depth atlas is generated according to process described in relation to FIGS. 5 to 7. A color atlas may also be generated at the same time. According to the present principles, a haptic atlas is generated, using similar processes for each haptic map type. At a step 113, every generated atlas is encoded in a data stream in association with corresponding metadata, for instance following one of the syntax formats proposed in the present application.

FIG. 12 illustrates a method 120 for decoding haptic features associated with material of 3D objects of a 3D scene for a volumetric rendering. At a step 121, a data stream is obtained and a depth atlas according to principles described in relation to FIGS. 5 to 7 is decoded from the stream. A color atlas may be decoded at the same time. A haptic atlas is decoded from the stream corresponding to a haptic type. If objects embed several haptic types, a haptic atlas is decoded for each of these haptic types. At a step 122, objects are un-projected from the depth atlas. If there is a color atlas, color information is associated to objects by un-projecting the color atlas. At a step 123, haptic information is un-projected onto the objects by using a similar process. Every decoded haptic atlas is un-projected and, so, haptic features are associated to 3D objects.

In another embodiment; the camera list used for haptic content may be different from the camera list used for the visual content. Indeed, the visual space and the haptic space can be different. For instance, the back of an object may be not seen while it can be touched or the required resolution may be less than the one used for color or depth information.

In this case the tables of the proposed syntax are duplicated to define another camera list (that is the haptic camera rig) where each camera of the list shares its syntax with the current one.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information.

Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
    obtaining a 3D point cloud, at least one point of said 3D point cloud comprising at least one component relative to a haptic feature, wherein said haptic feature belongs to a set of haptic features comprising rate-hardness, contact area spread rate, dynamic stiffness, local surface orientation, local indentation, stroke spectral response, kinetic friction, static friction, stick-slip and thermal profile;
    projecting a depth component and said at least one component relative to a haptic feature of points of the 3D point cloud onto patch pictures; and
    packing said patch pictures in an atlas image.

2. The method according to claim 1, wherein the depth component and said at least one component relative to a haptic feature are projected on different patch pictures, said different patch pictures being packed in different atlases.

3. The method according to claim 1, wherein said at least one component relative to a haptic feature is encoded as a color value.

4. A device comprising a processor configured for:
    obtaining a 3D point cloud, at least one point of said 3D point cloud comprising at least one component relative to a haptic feature, wherein said haptic feature belongs to a set of haptic features comprising rate-hardness, contact area spread rate, dynamic stiffness, local surface orientation, local indentation, stroke spectral response, kinetic friction, static friction, stick-slip and thermal profile;
    projecting a depth component and said at least one component relative to a haptic feature of points of the 3D point cloud onto patch pictures; and
    packing said patch pictures in an atlas image.

5. The device according to claim 4, wherein the depth component and said at least one component relative to a haptic feature are projected on different patch pictures, said different patch pictures being packed in different atlases.

6. The device according to claim 4, wherein said at least one component relative to a haptic feature is encoded as a color value.

7. A method comprising:
    obtaining a data stream comprising an atlas image packing patch pictures, said patch pictures being projections of points of a 3D point cloud comprising a depth component and at least one component relative to a haptic feature, wherein said haptic feature belongs to a set of haptic features comprising rate-hardness, contact area spread rate, dynamic stiffness, local surface orientation, local indentation, stroke spectral response, kinetic friction, static friction, stick-slip and thermal profile; and
    un-projecting components of pixels of said atlas by associating said at least one component relative to a haptic feature with points un-projected relatively to said depth component of said pixels.

8. The method of claim 7, further comprising rendering haptic effects according to said at least one component relative to a haptic feature associated with un-projected points and to a distance of a virtual camera used to render said un-projected points.

9. The method of claim 7, wherein said at least one component relative to a haptic feature is encoded as a color value.

10. The method of claim 7, wherein the depth component and said at least one component relative to a haptic feature are projected on different patch pictures, said different patch pictures being packed in different atlases.

11. A device comprising a processor configured for:
    obtaining a data stream comprising an atlas image packing patch pictures, said patch pictures being projections of points of a 3D point cloud comprising a depth component and at least one component relative to a haptic feature, wherein said haptic feature belongs to a set of haptic features comprising rate-hardness, contact area spread rate, dynamic stiffness, local surface orientation, local indentation, stroke spectral response, kinetic friction, static friction, stick-slip and thermal profile; and
    un-projecting components of pixels of said atlas by associating said at least one component relative to a haptic feature with points un-projected relatively to said depth component of said pixels.

12. The device of claim 11, wherein said processor is further configured for rendering haptic effects according to said at least one component relative to a haptic feature associated with un-projected points and to a distance of a virtual camera used to render said un-projected points.

13. The device of claim 11, wherein said at least one component relative to a haptic feature is encoded as a color value.

14. The device of claim 11, wherein the depth component and said at least one component relative to a haptic feature are projected on different patch pictures, said different patch pictures being packed in different atlases.

15. A data stream comprising an atlas image packing patch pictures, said patch pictures being projections of points of a 3D point cloud comprising a depth component and at least one component relative to a haptic feature, wherein said haptic feature belongs to a set of haptic features comprising rate-hardness, contact area spread rate, dynamic stiffness, local surface orientation, local indentation, stroke spectral response, kinetic friction, static friction, stick-slip and thermal profile.

* * * * *